United States Patent [19]

Hughes

[11] 3,806,029
[45] Apr. 23, 1974

[54] SHOCK ENHANCEMENT OF PRESSURE WAVE ENERGY

[75] Inventor: Nathaniel Hughes, Corona Del Mar, Calif.

[73] Assignee: Energy Sciences Incorporated, El Segundo, Calif.

[22] Filed: Jan. 24, 1973

[21] Appl. No.: 326,509

[52] U.S. Cl............ 239/3, 239/4, 239/102, 239/15, 239/DIG. 20, 181/33 N, 60/274, 60/275
[51] Int. Cl...... B05b 5/02, B05b 17/06, F01n 3/08
[58] Field of Search........ 137/15.1; 181/33 C, 33 H, 181/33 HB, 33 HA, 33 HC, 33 N, 35 R, 35 C, 36 C, 47 B, 56, 49, 50, 63, 33 D, 33 L; 239/4, 102, DIG. 20, 3, 15; 60/274, 275, 278, 279, 312

[56] References Cited
UNITED STATES PATENTS

| 1,578,682 | 3/1926 | Raymond | 181/49 |
|---|---|---|---|
| 2,354,179 | 7/1944 | Blanc | 60/278 X |
| 2,990,906 | 7/1961 | Audette | 181/50 |
| 3,070,313 | 12/1962 | Fortman | 239/4 X |
| 3,180,083 | 4/1965 | Heller | 60/275 X |
| 3,240,254 | 3/1966 | Hughes | 239/DIG. 20 |
| 3,373,752 | 3/1968 | Inoue | 239/4 X |
| 3,491,850 | 1/1970 | Heitner | 181/56 X |
| 3,540,653 | 11/1970 | Fabre | 239/3 X |
| 3,554,443 | 1/1971 | Hughes | 239/DIG. 20 |
| 3,581,992 | 6/1971 | Hughes | 239/102 |

FOREIGN PATENTS OR APPLICATIONS

| 569,700 | 1/1959 | Canada | 239/3 |
|---|---|---|---|
| 755,035 | 10/1952 | Germany | 181/35 R |
| 920,889 | 3/1963 | Great Britain | 137/15.1 |
| 986,576 | 3/1965 | Great Britain | 181/50 |
| 1,104,461 | 2/1968 | Great Britain | 239/15 |

Primary Examiner—Robert S. Ward, Jr.
Attorney, Agent, or Firm—Christie, Parker & Hale

[57] ABSTRACT

A standing shock is established at the throat plane of a supersonic nozzle. A streamlined slug, preferably a sphere, is disposed on the flow axis of the nozzle at a point slightly downstream of the throat plane to form a standing detached shock in the throat plane. In one embodiment, an elongated probe extending upstream from the slug to the throat plane is electrically grounded. In another embodiment, one secondary terminal of the ignition coil in an automobile engine is connected to the probe on the slug. In another embodiment, an electrode on the slug and an electrode downstream of the body outside the nozzle are connected to the respective output terminals of a source of electrical energy. A conductive coil wrapped around the nozzle in axial alignment with the flow path is also connected to the electrical source.

28 Claims, 7 Drawing Figures

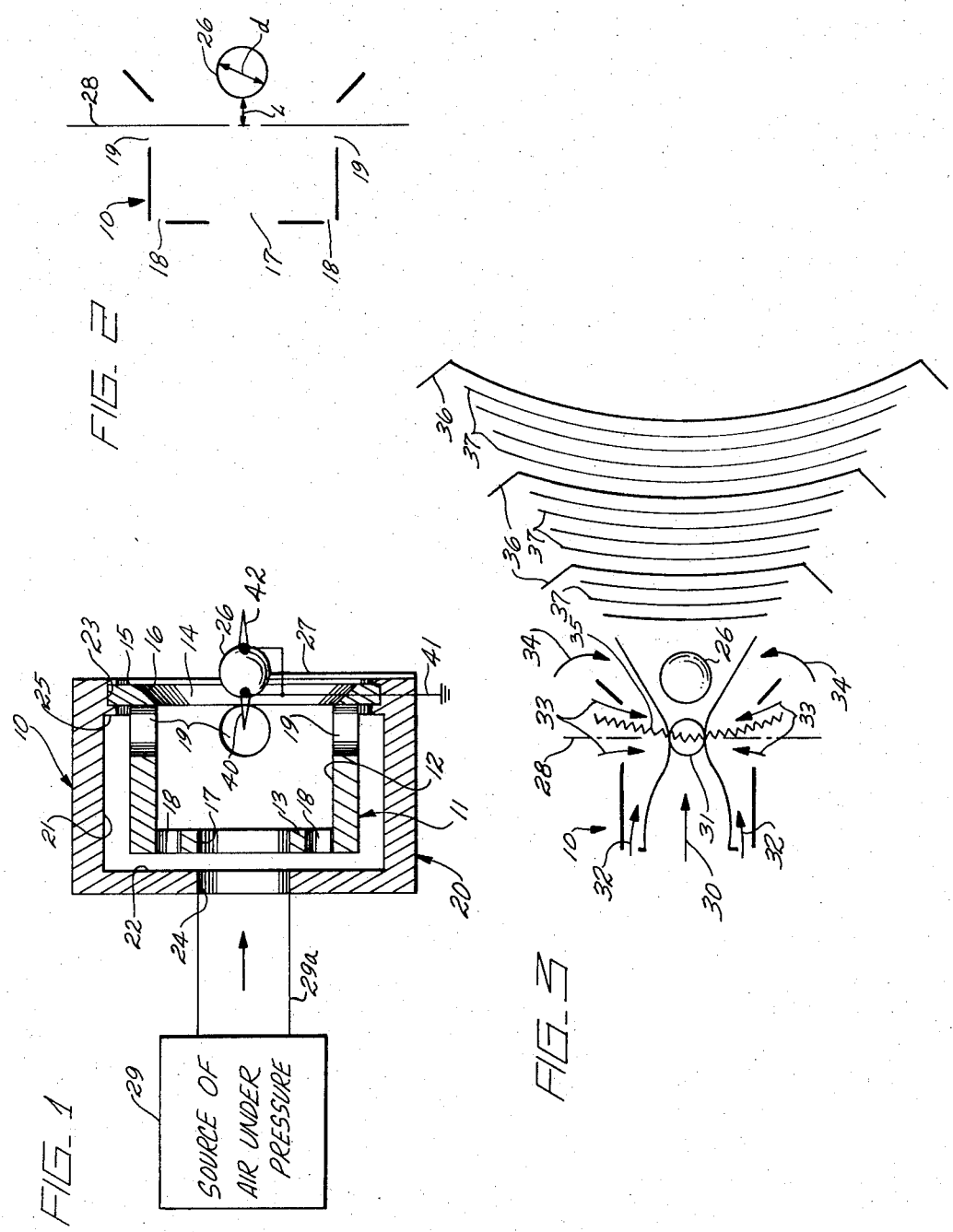

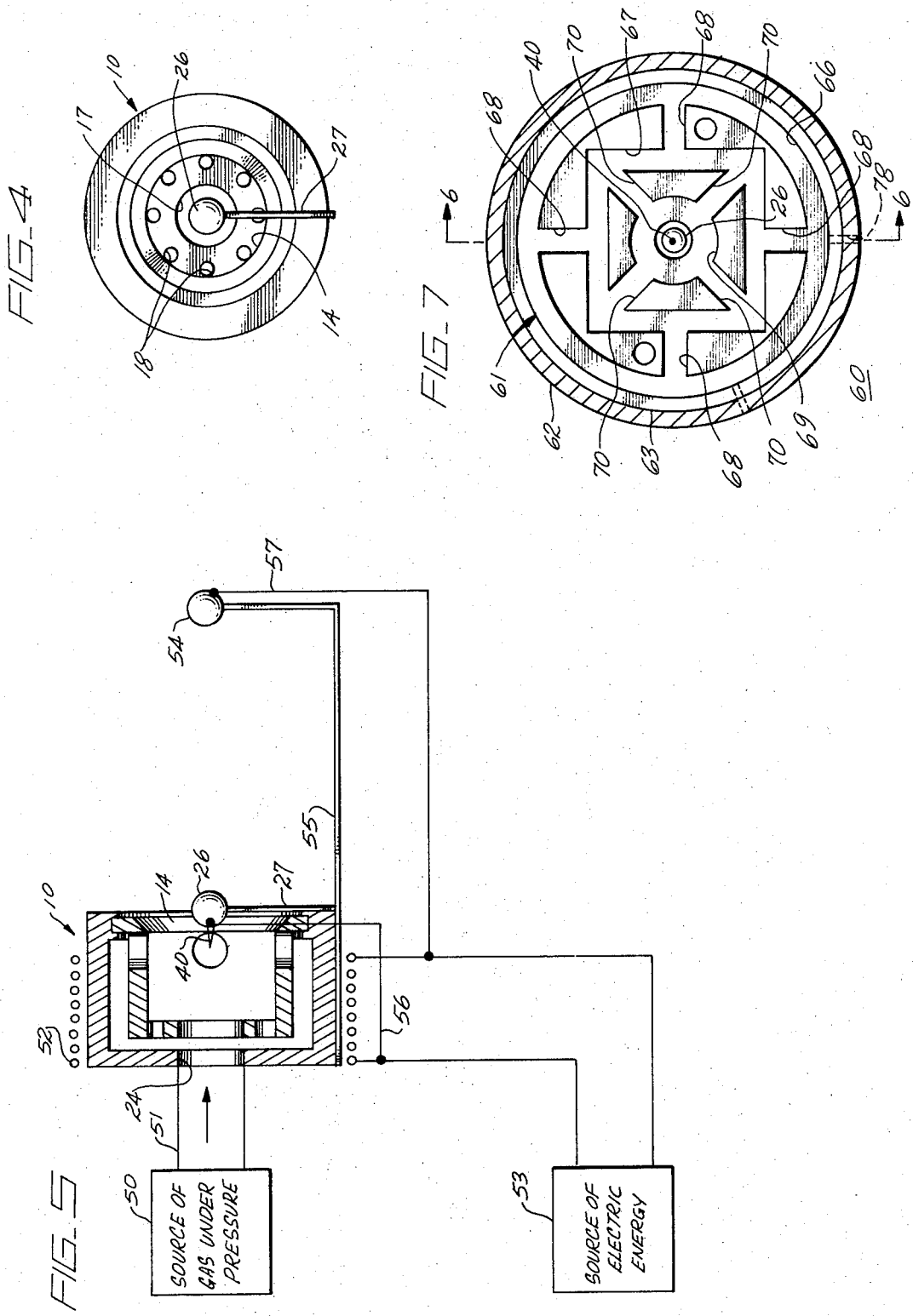

SHOCK ENHANCEMENT OF PRESSURE WAVE ENERGY

BACKGROUND OF THE INVENTION

This invention relates to the energization of a fluid stream and, more particularly, to shock enhancement of pressure waves in a fluid stream.

Hughes U.S. Pat. No. 3,554,443, which is assigned to the assignee of the present application, discloses a pressure wave generating cell in which a converging-diverging supersonic nozzle is formed by fluid boundary layers. A nozzle body open at its downstream end, bounded along its length by a side wall, and bounded at its upstream end by an end wall, forms a cylindrical passage. A core stream of fluid passes into the cylindrical passage through a large center hole in the end wall. Fluid entering the nozzle body through a plurality of smaller equally spaced auxiliary holes disposed in oppositely arranged pairs about the center hole in the end wall forms a fluid sheath around the core stream. Fluid entering the nozzle body through a plurality of oppositely disposed pairs of auxiliary holes in the side wall near the downstream end of the nozzle body stabilizes the throat plane of the nozzle. The converging-diverging boundary layer, which accelerates the fluid to supersonic velocity, is formed by the fluid entering the nozzle body through the auxiliary holes. The diameters of the holes are dimensioned so the resulting characteristic frequencies of the fluid streams passing through them reinforce each other. A cylindrical cell cover encloses the nozzle body to form around it an annular resonant chamber. The cell cover completely encloses the nozzle body, except for an opening at its upstream end that communicates with the holes of the nozzle body and except for the open downstream end of the nozzle body.

As disclosed in application Ser. No. 227,589, filed on Feb. 18, 1972 by Nathaniel Hughes, and assigned to the assignee of the present application, it has been discovered that the described pressure wave generating cell substantially ionizes the fluid passing through it. Copending application Ser. No. 326,408, filed concurrently herewith by Edson B. Gould III, and assigned to the assignee of the present invention, teaches the enhancement of pressure waves in a fluid stream by coupling electrical energy thereto. As taught in this copending application, the electrical energy may be direct-current, alternating-current, or a combination thereof. In the case of alternating-current electrical energy, most efficient coupling generally takes place when the frequency of the electrical energy and the pressure waves are multiples of a common divisor; more specifically, the frequencies are preferably direct multiples, one of the other.

SUMMARY OF THE INVENTION

According to the invention, a standing shock is established in the throat plane of a supersonic nozzle. A slug of material, preferably spherical, is disposed on the flow axis downstream of the throat plane. The slug forms a detached shock lying in the throat plane of the nozzle and presents a large surface in the path of the fluid core stream to intensify the ionizing shear force described in application Ser. No. 227,589. Consequently, the pressure wave energy and the ionization level in the fluid stream passing through the nozzle are increased.

In one embodiment, an electrically grounded probe protrudes from the slug to the throat plane. In another embodiment, one secondary terminal of the ignition coil in an automobile engine is connected to the probe on the slug. In another embodiment, the output terminals of a source of electrical energy are connected to an electrode on the slug, and another electrode downstream of the nozzle in its flow path, respectively.

BRIEF DESCRIPTION OF THE DRAWINGS

The features of specific embodiments of the best mode contemplated of carrying out the invention are illustrated in the drawings, in which:

FIG. 1 is a partially schematic diagram of one embodiment of apparatus for energizing a fluid stream in accordance with the principles of the invention;

FIG. 2 is a diagram illustrating the position of the spherical slug relative to the pressure wave generating cell of FIG. 1;

FIG. 3 is a diagram illustrating the fluid streams and pressure wave patterns produced by the apparatus of FIG. 1;

FIG. 4 is a front view of the pressure generating cell of FIG. 1;

FIG. 5 is a partially schematic diagram of another embodiment of apparatus for energizing a fluid stream in accordance with the principles of the invention;

FIG. 7 is a cross-sectional view of the energizing device shown in FIG. 6.

DETAILED DESCRIPTION OF THE SPECIFIC EMBODIMENTS

Figure 6:
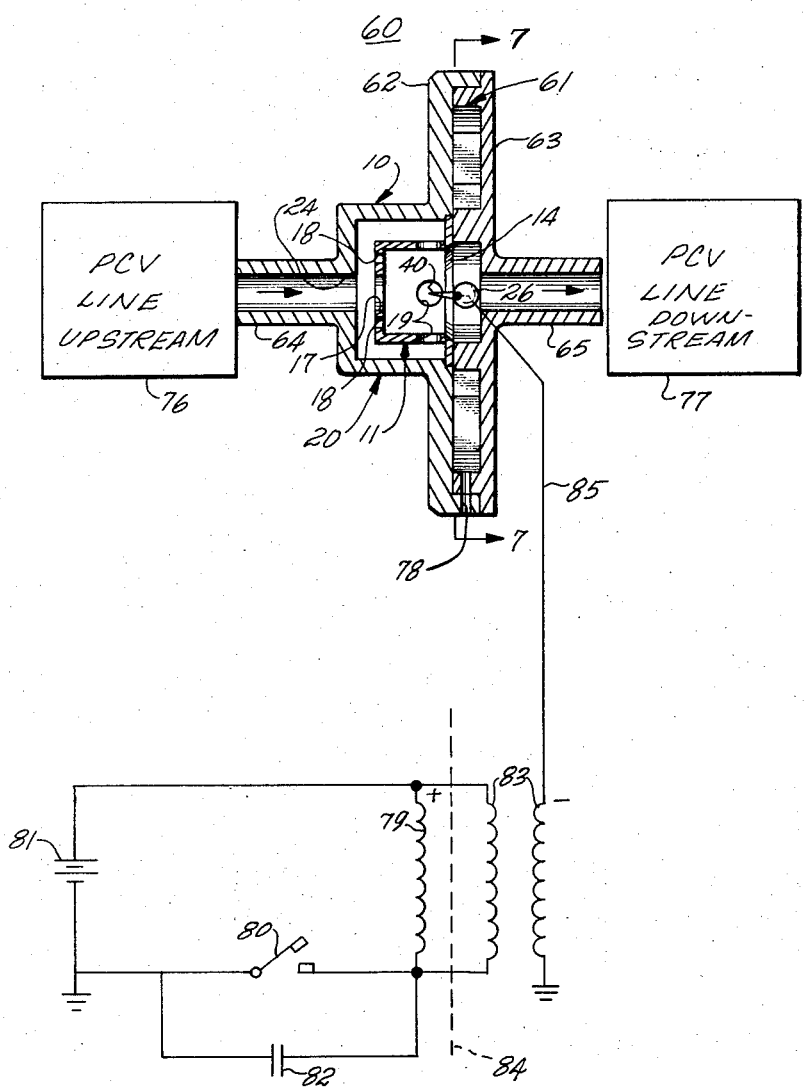
FIG. 6 is a partially schematic diagram of an energizing device employing the principles of the invention in a PCV line of an internal combustion engine.

In FIGS. 1 and 4 there is shown a pressure wave generating cell 10 that is identical to the cell disclosed in U.S. Pat. No. 3,554,443, which is incorporated herein by reference, except that cell 10 is preferably made from a dielectric material impregnated with a magnetic material, such as Teflon impregnated with a ceramic ferrite. Briefly, cell 10 comprises an insert 11 having a cylindrical side wall 12 and, at its upstream end, a circular end wall 13. At its downstream end, insert 11 has an outlet opening 14 and an outwardly extending flange 15. A counter sink 16 circumscribes outlet opening 14. End wall 13 has a large center hole 17 and a plurality of smaller auxiliary holes 18 arranged in oppositely disposed pairs in a circle about hole 17, as shown in FIG. 2. Side wall 12 has a plurality of auxiliary holes 19 arranged at 90° intervals near outlet opening 14. A cover 20, which has a cylindrical side wall 21, a circular upstream end wall 22 and a circular downstream opening 23, surrounds insert 11. End wall 22 has an inlet hole 24 aligned with hole 17 of insert 11. The inside surface of side wall 21 has an annular shoulder 25 near opening 23. The dimensions of insert 11 and cover 20 could be the same as the dimensions set forth in U.S. Pat. No. 3,554,443, except for hole 24, which preferably has a diameter equal to that of hole 17, or could be the following larger set of dimensions: diameter of hole 17 — 0.319 inches; diameter of holes 18 — 0.031 inches; diameter of holes 19 — 0.177 inches; diameter of hole 24 — 0.319 inches; inside diameter of insert 11 — 0.638 inches; inside diameter of cover 20 — 0.900 inches;

length of insert 11 from inside of end wall 13 to outlet opening 14 — 0.448 inches; distance from inside of end wall 13 to the axes of holes 19 — 0.319 inches; distance from outside of end wall 13 to outlet opening 14 — 0.480 inches; length of countersink 16 along the axis of symmetry of cell 10 — 0.040 inches; angle between countersink 16 and the axis of symmetry of cell 10 — 45°; distance from inside of end wall 22 to shoulder 25 — 0.556 inches.

A spherical slug 26 is aligned with the axis of symmetry of cell 10 at outlet opening 14, where it is supported by a stud 27. One end of stud 27 has a force fit with a bore formed in slug 26, and the other end of stud 27 is bonded to cell cover 20. Slug 26 and stud 27 are preferably made of a plastic material such as Teflon.

A source 29 of air under pressure is coupled by a conduit 29a to inlet hole 24 and outlet opening 14 is exposed to the atmosphere. As described in U.S. Pat. No. 3,554,443, the air entering cell 10 through inlet hole 24 flows through holes 17, 18, and 19 to outlet opening 14. The fluid flowing through hole 17 to opening 14 forms a core stream along the axis of symmetry of cell 10; the fluid flowing through holes 18 forms a sheath between the core stream and the inside surface of side wall 12; and the fluid flowing through holes 19 forms a constriction in the core stream. Thus, the fluid flowing through holes 18 and 19 forms around the core stream a converging-diverging boundary layer that accelerates the core stream to supersonic velocity as the core stream emerges from opening 14. When the supersonic core stream encounters the ambient atmosphere adjacent to outlet opening 14, pressure waves are produced. The pressure waves propagate downstream along the flow axis, which extends in alignment with the axis of symmetry of cell 10.

The placement of slug 26 in the core stream causes a detached standing shock to form upstream of slug 26. In FIG. 2, cell 10 is represented in outline, L is the distance from the surface of slug 26 to the detached standing shock, a line 28 represents the throat plane of the converging-diverging boundary layer formed by the supersonic nozzle and the center lines of holes 19 also lie in the throat plane represented by line 28, and $d$ is the diameter of slug 26. Slug 26 is so positioned that the detached standing shock lies on line 28; in other words, slug 26 is placed a distance L downstream of the throat plane of the converging-diverging boundary layer formed by the supersonic nozzle. The ratio $L/d$ is a known function of the Mach number of the core stream; the diameter $d$ of slug 26 and the nominal wavelength $\lambda$ of the shock waves produced by cell 10 are multiples of a common divisor. Thus, once the Mach number is determined, the distance L can be calculated. For the purpose of illustration, it is assumed that the nominal wavelength $\lambda$ and the diameter $d$ are each 0.177 inches, and the Mach number of the core stream is 1.2. In this case, for an ideal gas the distance L is about 0.089 inches.

FIG. 3 illustrates the fluid streams and shock waves formed in cell 10. Arrow 30 represents the core stream which converges to a minimum diameter at the throat plane, after which it diverges. Arrows 32 represent the fluid streams forming the sheath around the core stream. Arrows 33 represent the fluid streams that constrict the core stream at line 28, i.e., at the throat plane. A spheroid 31 in the throat plane represents the center of reaction inside cell 10 where all the streams meet and interact. Arrows 34 represent atmospheric air imploded into outlet opening 14 by the low pressure of the supersonic core stream. A wavy line 35 represents the detached standing shock formed by slug 26 in the throat plane. By forming the detached standing shock in the throat plane, it intersects the center of the reaction inside cell 10 and increases the already intense pressure wave energy and high level of ionization. Five and sixfold increases in the level of ionization have been observed. Further, the presence of slug 26 in the core stream increases the ionizing shear action exerted on the core stream fluid molecules, discussed in application Ser. No. 227,589; as the fluid molecules travel over the large surface of slug 26 at high velocity, a substantial number of electrons are sheared off, thereby further ionizing the fluid. However, when slug 26 is placed so the detached standing shock lies in the throat plane, it has been found that, despite the strong ionizing shear force, the resultant forces exerted on slug 26 by all the fluid streams represented by arrows 30, 32, 33, and 34 are approximately balanced; a fragile support will hole slug 26 in position, even in the face of large inlet pressures. As represented by lines 36, the primary pressure waves produced by cell 10 have the form of detached bow waves at their center and oblique shock waves at their ends. Between each of the primary pressure waves represented by lines 36 are a plurality of very closely spaced secondary waves represented by lines 37. An upward shift or redistribution of the frequency components in the spectrum of this pressure wave energy results, thereby making the available pressure wave energy more effective. The upward shift is greater for fluids of heavy molecules, so a density adjustment apparently takes place.

Even better results can be achieved by employing an electrically conductive probe 40 on slug 26 (FIG. 1). As represented in FIG. 1, probe 40, which is grounded by a conductor 41, extends from the surface of slug 26 upstream along the axis of symmetry of cell 10. The tip of probe 40 lies in the throat plane of the nozzle at the center of the reaction inside cell 10, so the resulting electrical effect is exerted at the most influential point. Thus, electrical charge delivered by probe 40 can aid the ionization at the center of the reaction represented by spheroid 31 and can spread across the detached standing shock to ionize the entire throat plane, including the fluid streams passing through holes 19. These fluid streams, being more highly energized by ionization, contribute even more to the overall energization of the core stream. Alternatively, in FIG. 1, an additional probe 42 can be positioned diametrically opposite probe 40 facing downstream. In such case, conductor 41 is also connected to probe 42.

In FIG. 5, cell 10 is identical to the component bearing the same reference numeral in FIG. 1. A source 50 of gas under pressure, which could be air or some other compressible fluid, is connected by a conduit 51 to inlet hole 24 of cell 10, and pressure waves having a nominal basic frequency $F_1$ emanate from outlet opening 14 of cell 10 in the manner described in connection with FIGS. 1 through 4. A coil 52 of electrically conductive insulated wire is wrapped around cell 10 in alignment with its axis of symmetry. The output terminals of a source 53 of electrical energy are connected to the respective ends of coil 52. Source 53 could be any of the types disclosed in the copending concurrently filed Gould application referenced above, such as direct current, alternating current or a combination of direct current and alternating current; further the source, if alternating current could have a frequency $F_2$ synchronized to frequency $F_1$, or an unrelated frequency. If source 53 is alternating current with a frequency unrelated to the nominal basic frequency of the pressure waves, it is simply necessary that source 53 have a high enough voltage to ionize substantially the fluid. Thereafter, the electrical energy in the form of the ionization is apparently aligned with the pressure waves by the molecules of the fluid itself, thereby achieving the desired frequency synchronization. The very significant consequence is that instead of increasing the fluid pressure to increase the energy in the fluid stream, this is achieved by increasing the electrical voltage. In fact, it has been observed that increases in the electrical voltage applied to the fluid stream cause approximately proportional increases in the energization of the fluid stream, other conditions being the same. To summarize, the invention permits the control over the extent of energization of the fluid stream as a function of either of two variables — fluid pressure or electrical voltage. A spherical metallic electrode 54 is supported by an L-shaped bracket 55 in alignment with the flow axis downstream of stud 27. At one end, bracket 55 has a force fit with electrode 54 and at the other end bracket 55 is bonded to cell cover 20. The diameter of electrode 54, the distance it is spaced from slug 26 and the nominal basic wavelength of the pressure waves corresponding to frequency $F_1$ are preferably multiples of a common divisor. The output terminals of source 53 are connected by conductors 56 and 57, respectively, to probe 40 and electrode 54. As a result, electrical energy in the form of an electrostatic field is effectively coupled to the fluid stream to further enhance the pressure wave energy and raise the ionization level. In some cases, this arrangement for applying electrical energy to the fluid stream could be employed either upstream or downstream of the throat plane, or could be employed along a segment of a fluid stream that is not presently passing through a nozzle.

In FIGS. 6 and 7, an energizing device 60 incorporating the principles of the invention is disclosed in the PCV line of an internal combustion automobile engine. Device 60 comprises cell 10 of FIG. 1 and a network 61 of channels having a square cross section. The components of cell 10 in FIG. 6 bear the same reference numerals as the corresponding components in FIG. 1 to facilitate comparison. In construction, device 60 comprises parts 62 and 63 that fit together, to form an airtight unit when joined as shown in FIG. 6. Fasteners not shown clamp parts 62 and 63 together. Cell cover 20 and a feed conduit 64 are formed integral with part 62; an exit conduit 65 is formed integral with part 63. Insert 11 is a separate part that fits into a cavity formed in part 62. As illustrated in FIG. 7, network 61 is formed in part 63. Network 61 comprises a circular channel 66 that circumscribes a square channel 67. Straight channels 68 connect channels 66 and 67. A circular cavity 69 centered within channel 67 is connected thereto by straight channels 70. The upstream portion of the PCV line, i.e., the portion leading from the crankcase, which is represented by a block 76, is connected to feed conduit 64. Exit conduit 65 is connected to the downstream portion of the PCV line, i.e., the portion leading to the intake system at the base of the carburetor, which is represented by a block 77. Network 61 is coupled to the atmosphere by a bleed conduit 78. If cell 10 has the larger set of dimensions, which are specifically enumerated in connection with FIG. 1, the channels of network 61 would typically have a cross-sectional side dimension of 0.172 inches, and bleed conduit 78 would typically have a diameter of 0.093 inches, in accordance with the principles taught in my copending application Ser. No. 217,124. As taught in that application, a network of properly dimensioned channels enhances the pressure wave energy generated by cell 10. Typically, the outside diameter of channel 66 is 2.539 inches, and the outside side dimension of channel 67 is 1.460 inches. The subatmospheric pressure produced in the intake system by the engine operation draws the crankcase gases through device 60 in the direction of the arrows in FIG. 6. As a result, pressure waves and ionized crankcase gases generated by cell 10 and enhanced by network 61 propagate into the intake system. It should be noted that the energization of the fluid stream is promoted by the provision of bleed conduit 78, which permits implosion of atmospheric air into the low pressure region at outlet opening 14.

In this embodiment, electrical energy from the ignition system of the engine is applied to probe 40. A primary 79 of an ignition coil and a pair of camshaft operated contact points 80 are connected across an automobile battery 81. A condenser 82 is connected in parallel with points 80. The secondary of the ignition coil, the distributor, and the spark plugs, which comprise the remainder of the ignition system, are not represented in FIG. 6. The automobile frame serves as the system ground. The primary winding of a transformer 83 is electrically connected in parallel with primary 79, but is not magnetically coupled thereto, which fact is signified by a broken line 84. One terminal of a secondary winding of transformer 83 is connected by a conductor 85 to probe 40, and the other terminal thereof is connected to the system ground. As represented by the plus sign in connection with primary 79, a positive pulsating voltage is generated by the ignition system. Transformer 83 is so connected to step up this pulsating positive voltage to a much larger, e.g., 5,000–25,000 volts, negative pulsating voltage at the ungrounded terminal of the secondary of transformer 83, as represented by the minus sign in connection with transformer 83. Thus, a very high pulsating negative voltage is applied to probe 40. Probe 40 serves as one electrode, and the automobile frame, i.e., the ignition system ground, serves as the other electrode of an electrical energizing system for the fluid stream passing through cell 10. The result is a marked reduction in automobile emissions and noticeably improved engine performance. Since the frequency of the pulsations is directly related to the engine RPM, more electrical energy is automatically applied to probe 40 during the modes of engine operation requiring greater energization to suppress emissions. Thus, in addition to eliminating the need for a separately provided source of electrical energy for device 60, use of the ignition system as the electrical energy source inherently provides energy at a rate commensurate with the engine's need for energization of the fluid stream leading into the intake system.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

In summary, the use of slug 26 alone in the manner described produces a substantial increase in pressure wave energy and the level of ionization; the additional application of electrical energy in the manner described produces an even further increase in pressure wave energy and the level of ionization, which increase is directly related to the quantity of electrical energy applied. Although the invention is illustrated in FIGS. 6 and 7 to reduce emissions and improve performance of an internal combustion engine, the invention has many other commercial applications, among which number general combustion, chemical mixing, particle deposition and coating, medical sterilization, and surface cleaning.

What is claimed is:

1. A method for generating pressure waves in a nozzle having an inlet, an outlet, a throat plane between the inlet and outlet, a flow axis through the nozzle, means for converging fluid along the flow axis between the inlet and the throat plane, and means for diverging fluid along the flow axis between the throat plane and the outlet, the method comprising the steps of:
   coupling to the inlet of the nozzle a fluid source at a first pressure to converge the fluid between the inlet and the throat plane;
   coupling the outlet to a fluid receiver at a second pressure lower than the first pressure to diverge the fluid between the throat plane and the outlet, the ratio of the first pressure to the second pressure being sufficient to establish a supersonic pressure wave producing fluid stream between the throat plane and the outlet; and
   placing an object in the path of the diverging fluid to establish approximately in the throat plane a standing shock that enhances the pressure waves produced in the supersonic fluid stream.

2. The method of claim 1, comprising the additional step of coupling electrical energy to the fluid stream within the nozzle.

3. The method of claim 2, in which the electrical energy is coupled to the fluid stream across the standing shock in the throat plane.

4. The method of claim 1, in which the object has circular symmetry about an axis, and the placing step places the axis of the object in alignment with the flow axis of the nozzle.

5. The method of claim 4, in which the object is spherical.

6. The method of claim 1, in which the object has an electrical probe extending approximately to the throat plane, the method additionally comprising the step of coupling electrical energy to the probe.

7. The method of claim 1, in which the slug has an electrically conductive member, the method comprising the additional step of grounding the electrically conductive member.

8. A fluid energizing system comprising:
   a nozzle having an inlet, an outlet, a throat plane, a flow axis, means for converging fluid passing along the flow axis from the inlet to the throat plane, and means for diverging fluid flowing along the flow axis from the throat plane to the outlet;
   a source of fluid at a first pressure connected to the nozzle inlet;
   a fluid receiver at a second pressure lower than the first pressure connected to the nozzle outlet, the ratio of the first and second pressures being sufficient to accelerate the fluid from the source along the flow axis to supersonic velocity at the nozzle outlet;
   a streamlined body disposed in the nozzle on the axis near the throat plane to form an annular passage within the nozzle;
   a first conductive electrode mounted on the streamlined body;
   a second conductive electrode disposed downstream of the nozzle outlet; and
   a source of electrical energy having first and second output terminals connected respectively to the first and second electrodes.

9. The system of claim 8, in which the nozzle comprises:
   a cylindrical nozzle body open at its downstream end to form the outlet, bounded along its length by a side wall, and bounded at its upstream end by an end wall having a large center hole;
   a plurality of smaller equally spaced peripheral holes disposed about the center hole and the end wall in oppositely arranged pairs;
   a plurality of pairs of oppositely disposed throat plane stabilizing holes lying in a common plane in the side wall near the inlet end of the conduit; and a cylindrical cell cover enclosing the nozzle body to form an annular region surrounding the cylindrical side wall of the nozzle body, the cell cover completely enclosing the nozzle body except for its open end, and an opening at its upstream end that forms the inlet.

10. The system of claim 8, additionally comprising a conductive coil wrapped around the nozzle in alignment with the flow axis, and means for connecting the ends of the coil to the first and second output terminals respectively of the source of electrical energy.

11. The system of claim 8, in which the body is spherical.

12. The system of claim 11, in which the electrode is an elongated probe extending upstream from the body along the flow axis.

13. The system of claim 8, in which the body produces a standing shock within the nozzle and the body is disposed in the nozzle downstream of the throat plane so the standing shock lies in the throat plane.

14. The system of claim 13, in which the first electrode is an elongated pointed probe extending upstream from the body along the flow axis such that the end of the probe lies in the throat plane.

15. The system of claim 14, in which the body is spherical and the second electrode is spherical.

16. The system of claim 15, in which the nozzle produces pressure waves having a given nominal wavelength, the given wavelength, the diameter of the body, the diameter of the second electrode, and the spacing between the body and the second electrode being multiples of a common divisor.

17. A fluidic system comprising:
   a source of pressure waves having a given nominal wavelength;

a spherical slug disposed in the path of the pressure waves; and means mounted on the slug for coupling electrical energy to the pressure waves, the diameter of the slug and the wavelength of the pressure waves being multiples of a common divisor.

18. The system of claim 17, in which the electrical energy is alternating current having a frequency synchronized to the pressure waves.

19. In a pressure wave generating system having means for accelerating a fluid stream to supersonic velocity and means for diverging the supersonic fluid stream, means for enhancing the pressure waves comprising a slug of material disposed in the divergent supersonic stream.

20. The pressure wave generating system of claim 19, in which the accelerating means and diverging means comprise:

a cylindrical nozzle body open at its downstream end to form the outlet, bounded along its length by a side wall, and bounded at its upstream end by an end wall having a large center hole;

a plurality of smaller equally spaced peripheral holes disposed about the center hole and the end wall in oppositely arranged pairs;

a plurality of pairs of oppositely disposed throat plane stabilizing holes lying in a common plane in the side wall near the inlet end of the conduit; and a cylindrical cell cover enclosing the nozzle body to form an annular region surrounding the cylindrical side wall of the nozzle body, the cell cover completely enclosing the nozzle body except for its open end, and an opening at its upstream end that forms the inlet.

21. The enhancing means of claim 19, in which the pressure waves from the source propagate along an axis and the slug is symmetrical about the axis.

22. The enhancing means of claim 21, in which the slug presents a blunt profile to the pressure waves.

23. The enhancing means of claim 22, in which the slug is spherical.

24. The enhancing means of claim 23, in which the pressure waves have a given nominal wavelength, the given wavelength and the diameter of the slug being multiples of a common divisor.

25. The enhancing means of claim 24, in which the source is a nozzle having a throat plane, means for converging fluid flow upstream of the throat plane, means for diverging fluid flow downstream of the throat plane, and a dimension to accelerate fluid flowing through the nozzle to supersonic velocity to produce a standing shock upstream of the slug, the slug being positioned downstream of the throat plane so that the standing shock lies approximately in the throat plane.

26. The enhancing means of claim 25, in which the nozzle comprises a cylindrical passage through which the fluid flows from the source and means for forming a converging-diverging fluid boundary layer in the passage.

27. The enhancing means of claim 26, in which the cylindrical passage comprises a nozzle body open at its downstream end, bounded along its length by a side wall, and bounded at its upstream end by an end wall having a large center hole; and the means for forming a boundary layer comprises a plurality of smaller equally spaced peripheral holes disposed about the center hole in the end wall in oppositely arranged pairs, a plurality of oppositely disposed pairs of throat plane stabilizing holes lying in the throat plane in the side wall near the downstream end of the nozzle body, and a cylindrical cell cover enclosing the nozzle body to form an annular region surrounding the side wall of the nozzle body, the cell cover completely enclosing the nozzle body except for an opening at its upstream end that communicates with the holes of the nozzle body and except for the open downstream end of the nozzle body.

28. The enhancing means of claim 27, additionally comprising means for coupling electrical energy to the slug.

* * * * *